United States Patent
Lang et al.

(10) Patent No.: US 11,139,718 B2
(45) Date of Patent: Oct. 5, 2021

(54) ELECTRIC MACHINE WITH AUXILIARY BLOWER MOUNTING ARRANGEMENT AND/OR MODULAR EXHAUST ASSEMBLY

(71) Applicant: Siemens Industry, Inc., Alpharetta, GA (US)

(72) Inventors: Nicholas G. Lang, Cincinnati, OH (US); Keith Kane, Fairfield, OH (US); Ryan Edward Queen, Amelia, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 612 days.

(21) Appl. No.: 16/041,002

(22) Filed: Jul. 20, 2018

(65) Prior Publication Data

US 2019/0027996 A1    Jan. 24, 2019

Related U.S. Application Data

(60) Provisional application No. 62/535,364, filed on Jul. 21, 2017.

(51) Int. Cl.
| | |
|---|---|
| *H02K 9/06* | (2006.01) |
| *H02K 5/20* | (2006.01) |
| *H02K 5/24* | (2006.01) |
| *H02K 17/16* | (2006.01) |
| *F04D 29/58* | (2006.01) |
| *F04D 29/70* | (2006.01) |
| *F04D 29/66* | (2006.01) |
| *H02K 9/12* | (2006.01) |
| *F04D 25/08* | (2006.01) |
| *F04D 29/28* | (2006.01) |
| *F04D 29/60* | (2006.01) |

(52) U.S. Cl.
CPC ............ *H02K 9/06* (2013.01); *F04D 29/5806* (2013.01); *F04D 29/664* (2013.01); *F04D 29/701* (2013.01); *H02K 5/20* (2013.01); *H02K 5/24* (2013.01); *H02K 9/12* (2013.01); *H02K 17/16* (2013.01); *F04D 25/08* (2013.01); *F04D 29/282* (2013.01); *F04D 29/602* (2013.01)

(58) Field of Classification Search
CPC .. H02K 9/06; H02K 9/12; H02K 5/20; H02K 5/24; H02K 17/16; F04D 29/5806; F04D 29/701; F04D 29/664; F04D 25/08; F04D 29/282; F04D 29/602
USPC ..................................... 310/59, 89
See application file for complete search history.

(56) References Cited

U.S. PATENT DOCUMENTS

| 1,808,845 | A | * | 6/1931 | Gifford | ............... | H02K 9/04 |
| | | | | | | 310/58 |
| 5,763,969 | A | * | 6/1998 | Metheny | ............. | H02K 9/14 |
| | | | | | | 310/52 |

(Continued)

FOREIGN PATENT DOCUMENTS

| EP | 1628004 A1 | 2/2006 |
| JP | 2002233104 A | 8/2002 |
| TW | 201532374 A | 8/2015 |

*Primary Examiner* — John K Kim

(57) ABSTRACT

An electric machine includes a frame and a plurality of electrical components including a rotor assembly and a stator assembly. The electric machine further includes an auxiliary blower mounting arrangement for cooling the electrical components and/or a modular exhaust assembly for noise attenuation, wherein the modular exhaust assembly further has one or more louvers allowing cooling fluid for cooling the electrical components to exit the electric machine.

17 Claims, 5 Drawing Sheets

(56) References Cited

U.S. PATENT DOCUMENTS

| | | | |
|---|---|---|---|
| 6,602,058 B1* | 8/2003 | Stewart | F04D 25/082 |
| | | | 417/366 |
| 7,027,938 B1* | 4/2006 | Dister | B60L 3/0023 |
| | | | 702/188 |
| 7,633,195 B2* | 12/2009 | Drubel | H02K 11/046 |
| | | | 310/58 |
| 8,167,585 B2 | 5/2012 | Kreitzer et al. | |
| 8,240,429 B1 | 8/2012 | Singhal | |
| 8,674,565 B2* | 3/2014 | Lang | H02K 9/06 |
| | | | 310/52 |
| 9,419,494 B2 | 8/2016 | Lang | |
| 9,490,676 B2* | 11/2016 | Weisser | F04D 29/083 |
| 10,562,711 B2* | 2/2020 | Van Holthe Tot Echten | |
| | | | B65G 23/08 |
| 2004/0000821 A1* | 1/2004 | Ciciliani | H02K 5/15 |
| | | | 310/52 |
| 2005/0123423 A1* | 6/2005 | Weisser | F04D 29/083 |
| | | | 417/423.7 |
| 2007/0099554 A1* | 5/2007 | Liang | F04D 29/70 |
| | | | 454/76 |
| 2007/0159791 A1* | 7/2007 | Pongracz | H05K 7/20145 |
| | | | 361/690 |
| 2013/0214635 A1* | 8/2013 | Yabe | H02K 17/20 |
| | | | 310/197 |
| 2015/0222160 A1* | 8/2015 | Lee | H02K 9/14 |
| | | | 310/58 |
| 2019/0027996 A1* | 1/2019 | Lang | H02K 17/16 |
| 2019/0154061 A1* | 5/2019 | Gilliland | F04D 25/082 |

* cited by examiner

ELECTRIC MACHINE WITH AUXILIARY BLOWER MOUNTING ARRANGEMENT AND/OR MODULAR EXHAUST ASSEMBLY

CROSS REFERENCE TO RELATED APPLICATIONS

This application claims benefit of U.S. provisional application No. 62/535,364 filed 21 Jul. 2017 in the United States Patent and Trademark Office, the content of which is herein incorporated by reference in its entirety.

BACKGROUND

1. Field

Aspects of the present disclosure relate to electric machines, such as for example electric motors and generators, including induction motors used for example for fracking pumps, with an auxiliary blower mounting arrangement and/or a modular exhaust assembly.

2. Description of the Related Art

Electric machines, such as induction motors, for special applications should be optimized for noise, temperature rise, vibration, and weight. To improve cooling of the machine, certain applications for industrial equipment require auxiliary cooling fans, herein also referred to as blowers, comprising a blower and blower motor operating the blower. Some of these applications are in environments or duties where they are exposed to high impact/shock loading. While maintaining a compact overall package, auxiliary blower motor mounting arrangements may be exposed to highest stress seen in the system during impact/shock. Known auxiliary blower motors are typically flange mounted to simple panels, foot mounted on pedestals or mounted directly spanning the inlet air opening of the auxiliary fan.

Generally increased airflow can improve temperature rise and weight, but also leads to higher noise levels. Noise attenuation may add weight, take up additional space, or cause increased restriction to airflow. Known methods include incorporate baffling and bending in an air path to reduce noise as opposed to tuned length splitters. Also, splitters have been added as auxiliary components, external to the main motor housing/enclosure.

SUMMARY

A first aspect of the present disclosure provides an electric machine comprising a frame and a plurality of electrical components including a rotor assembly and a stator assembly, an auxiliary blower mounting arrangement for cooling the electrical components by creating an internal fluid flow path between the electrical components and the auxiliary blower mounting arrangement, wherein the auxiliary blower mounting arrangement comprises a blower motor and a motor mount, wherein the blower motor is coupled to the frame and positioned inside the motor mount, and wherein the motor mount comprises a plurality of cooling openings for creating a blower motor fluid flow path for cooling the blower motor.

A second aspect of the present disclosure provides an electric machine comprising a frame and a plurality of electrical components including a rotor assembly and a stator assembly, a modular exhaust assembly for noise attenuation, the modular exhaust assembly comprising at least one acoustical splitter component and an exhaust cover, the exhaust cover coupled to the frame, wherein the modular exhaust assembly further comprises at least one louver allowing cooling fluid for cooling the electrical components along an internal fluid flow path to exit the electric machine.

DETAILED DESCRIPTION

To facilitate an understanding of embodiments, principles, and features of the present disclosure, they are explained hereinafter with reference to implementation in illustrative embodiments. In particular, they are described in the context of being electric machines, which include for example electric motors such alternating current (AC) asynchronous motors, for example induction motors used for example for fracking pumps, and AC synchronous motors, as well as electric generators, with an auxiliary blower mounting arrangement and/or a modular exhaust assembly. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
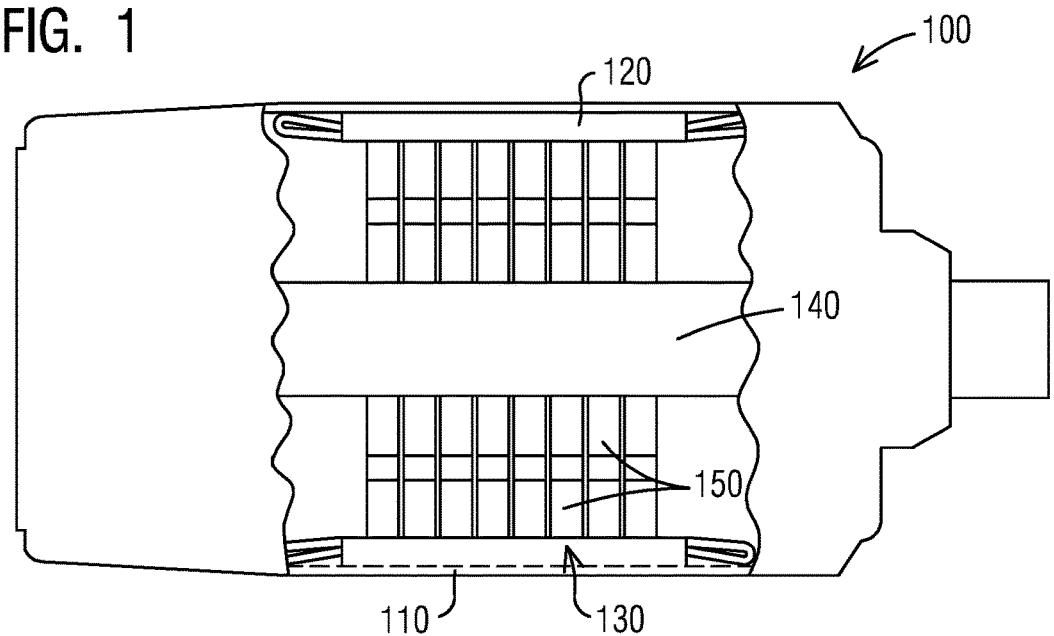
FIG. 1 illustrates schematically a cut away elevational view of a known induction motor in accordance with embodiments of the present disclosure.

FIG. 1 shows a known induction motor 100 in partial cut away axial view. The exemplary motor 100 is a totally enclosed fan cooled alternating current motor, it being understood that the present disclosure may be applied to other types of electric machines that have a rotating mass. The motor 100 has a housing 110 and a stator 120 circumferentially oriented therein. The stator 120 forms a generally annular core into which is axially inserted a rotor assembly 130, which shall hereafter generally be referred to as a rotor. The rotor 130 has a shaft 140 onto which are affixed a stack of abutting rotor laminas 150. The rotor laminas 150, which are flat sheets of insulation coated ferromagnetic metal (e.g., pressed steel), are abutted to form the rotor core. For simplicity, motor components that are not deemed necessary for one skilled in the art to make and use the present disclosure are not included in the figures. For example, neither the axial conductive copper or aluminum axial bars that would normally be inserted in the outer periphery slots formed in the rotor laminas nor short circuit rings normally on the respective ends of the rotor 130 are shown.

Figure 2:
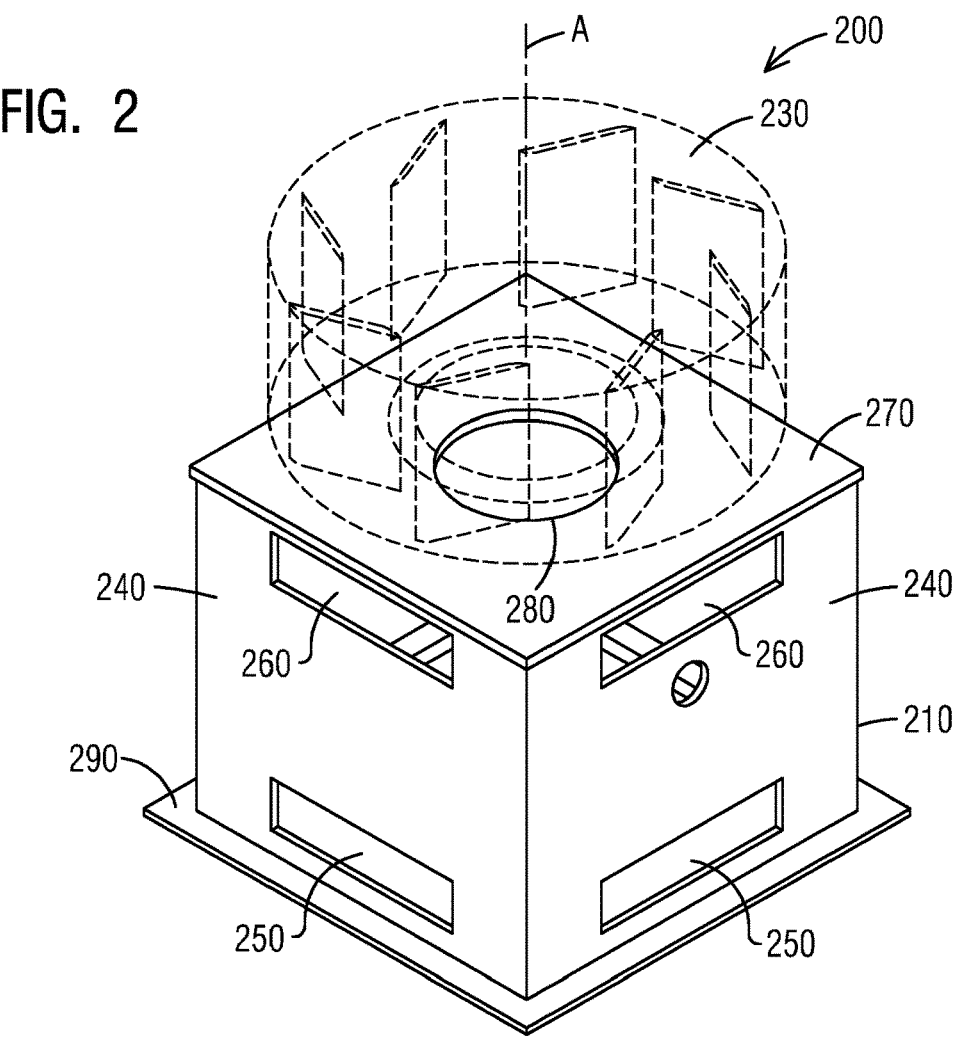
FIG. 2 illustrates a perspective view of an auxiliary blower mounting arrangement in accordance with an exemplary embodiment of the present disclosure.

FIG. 2 illustrates a perspective view of an auxiliary blower mounting arrangement 200 in accordance with an exemplary embodiment of the present disclosure. The auxiliary blower mounting arrangement 200 comprises a motor mount 210, a blower motor 220 (see FIG. 3) and a cooling fan or blower 230. The auxiliary blower mounting arrangement 200 is coupled to an electric machine for cooling purposes which will be described later, for example with reference to FIG. 3.

The motor mount 210 is adapted as mounting box with multiple cooling openings 250, 260 to accommodate auxiliary blower motor cooling airflow path(s). In an example, the motor mount 210 can be configured as rectangular or square box, wherein each side surface 240 of the box comprises a lower cooling opening 250 and an upper cooling opening 260. The openings 250, 260 are arranged so that cooling airflow paths for the blower motor 220 are provided (see also FIG. 3). Specifically, cooling air may enter the motor mount 210 through the lower cooling openings 250, cool the blower motor 220 inside the motor mount 210 and then exit the motor mount 210 through the upper cooling openings 260. In an example, the cooling openings 250, 260 are rectangular as illustrated in FIG. 2. However, it should be noted that the motor mount 210 itself can comprise a different shape or configuration housing the blower motor 220, and that the motor mount 210 can comprise different numbers of cooling openings 250, 260 with different forms, shapes and sizes of the cooling openings 250, 260.

The fan or blower 230 is arranged above the motor mount 210, wherein an axis of rotation A of the blower 230 is parallel to an axis of rotation of the blower motor 220 and perpendicular to an upper surface 270 of the motor mount 210. The upper surface 270 of the motor mount 210 comprises opening 280 so that a rotor shaft of the blower motor 220 can be coupled to the blower 230, the rotor shaft rotating the blower 230 when in operation. A lower surface (opposite the upper surface 270) of the motor mount 210 is omitted since the motor mount 210 is coupled to a frame of an electric machine via the lower surface. For mounting the motor mount 210 to the frame, the motor mount 210 comprises a mounting flange 290 at the lower portion of the motor mount 210. The mounting flange 290 can be a circumferential flange along all the side surfaces 240 as shown in FIG. 2 or can be partial flange(s) along lower portions of for example one or two side surfaces 240.

Figure 3:
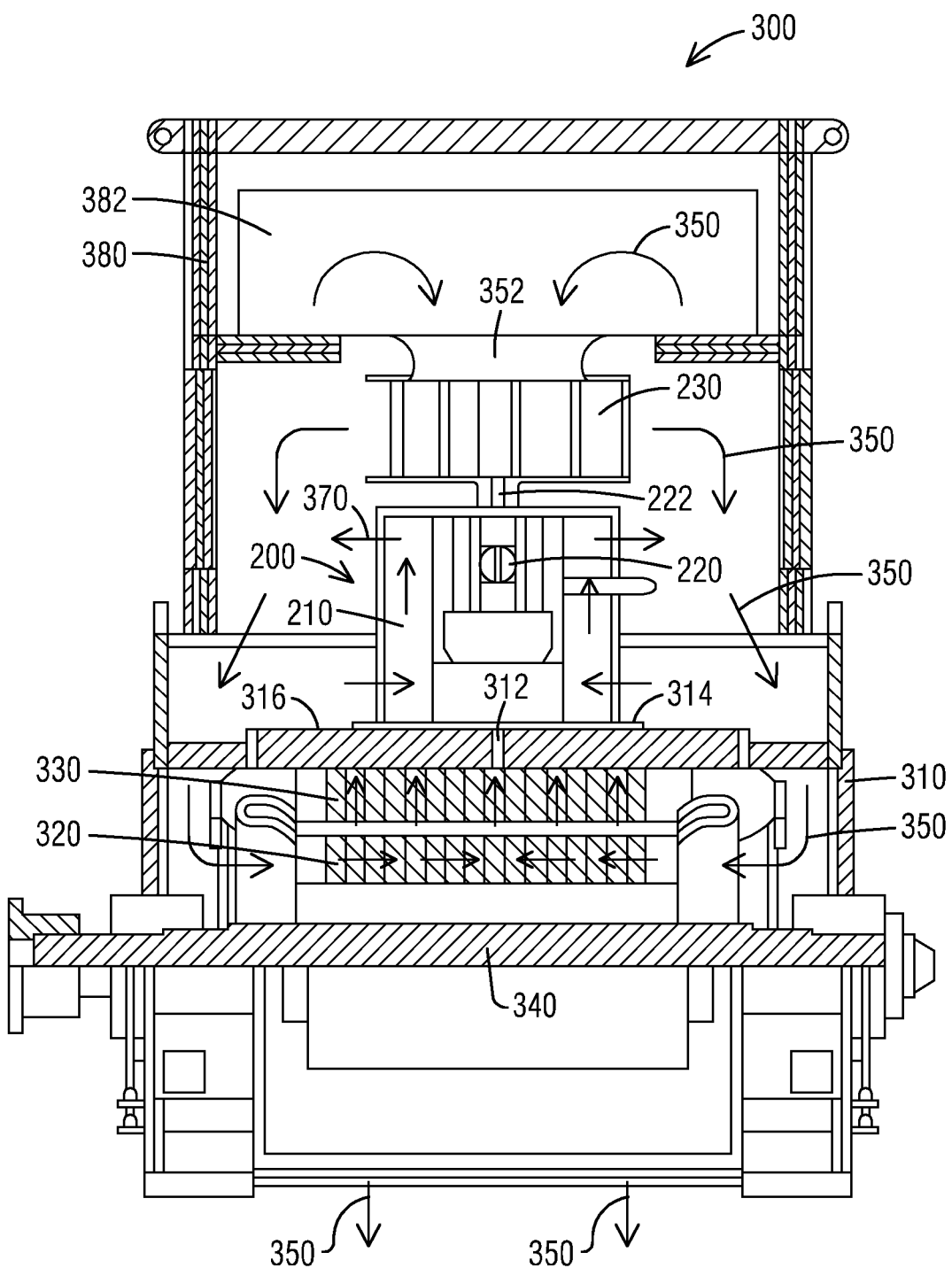
FIG. 3 illustrates a sectional view of an electric machine including an auxiliary blower mounting arrangement and airflow pattern in accordance with an exemplary embodiment of the present disclosure.

FIG. 3 illustrates a sectional view of an electric machine 300 including an auxiliary blower mounting arrangement 200 and airflow pattern in accordance with an exemplary embodiment of the present disclosure. The electric machine 300 is configured as induction motor, it being understood that the present disclosure may be applied to other types of electric machines that have a rotating mass. The machine 300 comprises a frame 310 and a plurality of electrical components including a rotor assembly 320 and a stator assembly 330.

As described before with reference to FIG. 2, the auxiliary blower mounting arrangement 200 comprises blower motor 220 and a motor mount 210. The motor mount 210 is adapted as mounting box comprising sheet metal and bolted to the frame 310, for example via bolts 314 and mounting flange 290.

The blower motor 220 is coupled to the frame 310 via connection point 312. Further, the blower motor 220 is arranged vertically inside the motor mount 210 and coupled to an upper surface 316 of the frame 310, thus the auxiliary blower mounting arrangement 200 being arranged on top of the upper surface 316 of the frame 310.

The blower 230 is coupled to a rotating shaft 222 of the blower motor 220. When in operation, the blower motor 220 rotates the blower 230, wherein the auxiliary blower mounting arrangement 200 creates or contributes to an internal fluid flow path illustrated by arrows 350, between the electrical components 320, 330 and the auxiliary blower mounting arrangement 200.

As illustrated in FIG. 3, blower 230 intakes or draws cooling fluid, for example ambient air, through cooling fluid intake 352, wherein cold cooling fluid flows towards and through the electrical components, such as rotor assembly 330 and stator assembly 320. Specifically, the cold cooling fluid enters the rotor assembly 330 through axial vents within the rotor assembly 330 and absorbs heat while flowing through the rotor assembly 330. From the rotor assembly 330, the cooling fluid flows towards and through the stator assembly 320 via radial and/or axial vents in the stator assembly 320 as well as in the rotor assembly 330 and absorbs more heat from the stator assembly 320. From the stator assembly 320, the saturated cooling fluid exits the machine 300 through one or more cooling fluid exit(s) which can be located at various locations of the electric machine 300.

In addition to the internal fluid flow path illustrated by arrows 350, auxiliary blower motor fluid flow path(s) illustrated by arrows 370 is/are provided for cooling the blower motor 220. As described before with reference to FIG. 2, the motor mount 210 comprises lower cooling openings 250 and upper cooling openings 260 allowing cooling fluid to circulate, wherein cooling fluid, for example air, enters the motor mount 210 through the lower cooling openings 250 and exits the motor mount 210 through the upper cooling openings 260. The cooling fluid for the blower motor 220 is also provided by the blower 230 drawing cooling fluid through cooling fluid intake 352.

The electric machine 300 may further comprise housing 380 covering the auxiliary blower mounting arrangement 200. The housing 380 comprises multiple fluid intakes 382 providing cooling fluid from the outside, for cooling purposes. The housing 380 can comprise multiple filters 384 for filtering the cooling fluid positioned at the fluid intakes 382 (see FIG. 7).

It should be noted that the electric machine 300 may comprise further cooling fans or blowers, for example arranged on rotor shaft 340, which may contribute to the internal fluid flow path illustrated by the arrows 350.

The connection point 312 of the blower motor 220 to the frame 310 of the electric machine 300 is more rigid compared to for example blower motors flange mounted to simple panels or foot mounted on pedestals. Further, the motor mount 210 is designed to allow for lower stress levels during shock load of the machine 300. Determination of arrangement for suitable structure may be done by finite element methods. The auxiliary blower mounting arrangement 200 helps secure the auxiliary blower motor 220 and assembly 200, reducing the stress levels seen at the mounting connection to the primary equipment, e.g., machine 300.

Figure 4:
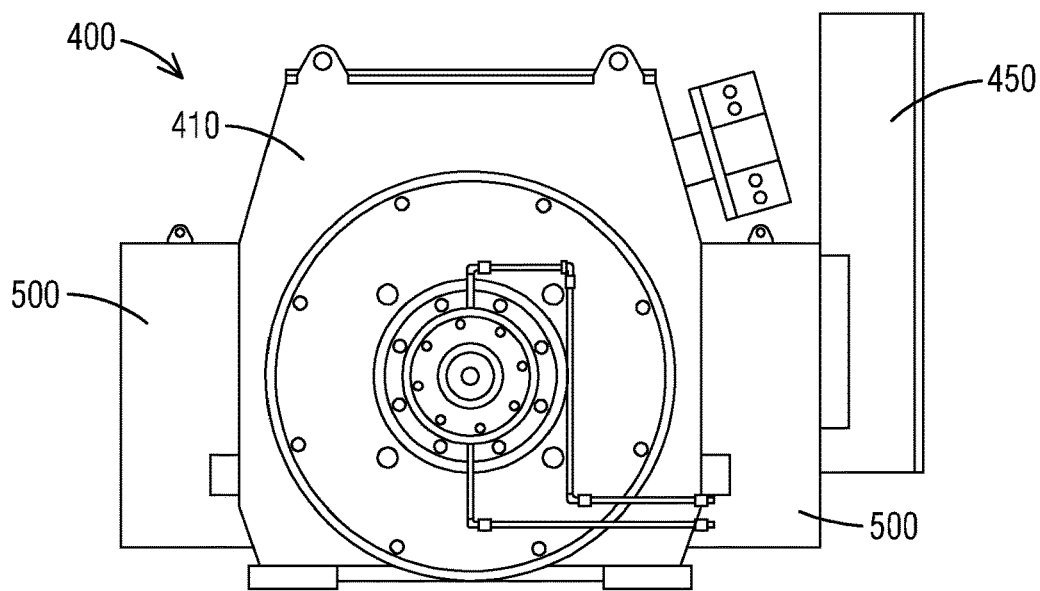
FIG. 4 illustrates a side view of an electric machine including a modular exhaust assembly in accordance with an exemplary embodiment of the present disclosure.

FIG. 4 illustrates a side view of an electric machine 400 including a modular exhaust assembly 500 in accordance with an exemplary embodiment of the present disclosure. The electric machine 400 can be configured as induction motor as illustrated in FIG. 3, it being understood that the machine 400 may be another type of electric machine.

The electric machine 400 comprises a frame or housing 410 and a plurality of electrical components including a rotor assembly and a stator assembly positioned inside the housing 410 (see for example FIG. 3). Further, in accordance with an exemplary embodiment, the machine 400 comprises a modular exhaust assembly 500 for noise attenuation. According to the example of FIG. 4, the machine 400 comprises two modular exhaust assemblies 500 for noise attenuation arranged opposite to each other. A junction or connection box 450 can be connected to one of the modular exhaust assemblies 500.

Figure 6:
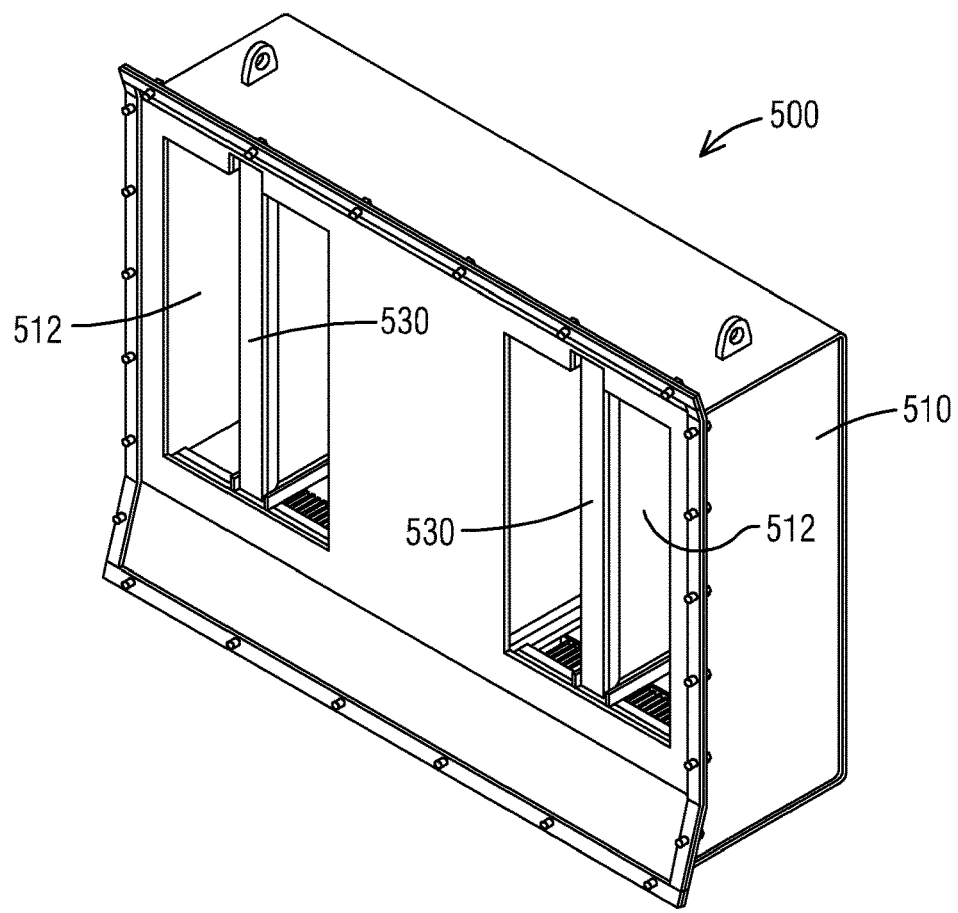
FIG. 6 illustrates an isometric view of a modular exhaust assembly in accordance with an exemplary embodiment of the present disclosure.
Figure 5:
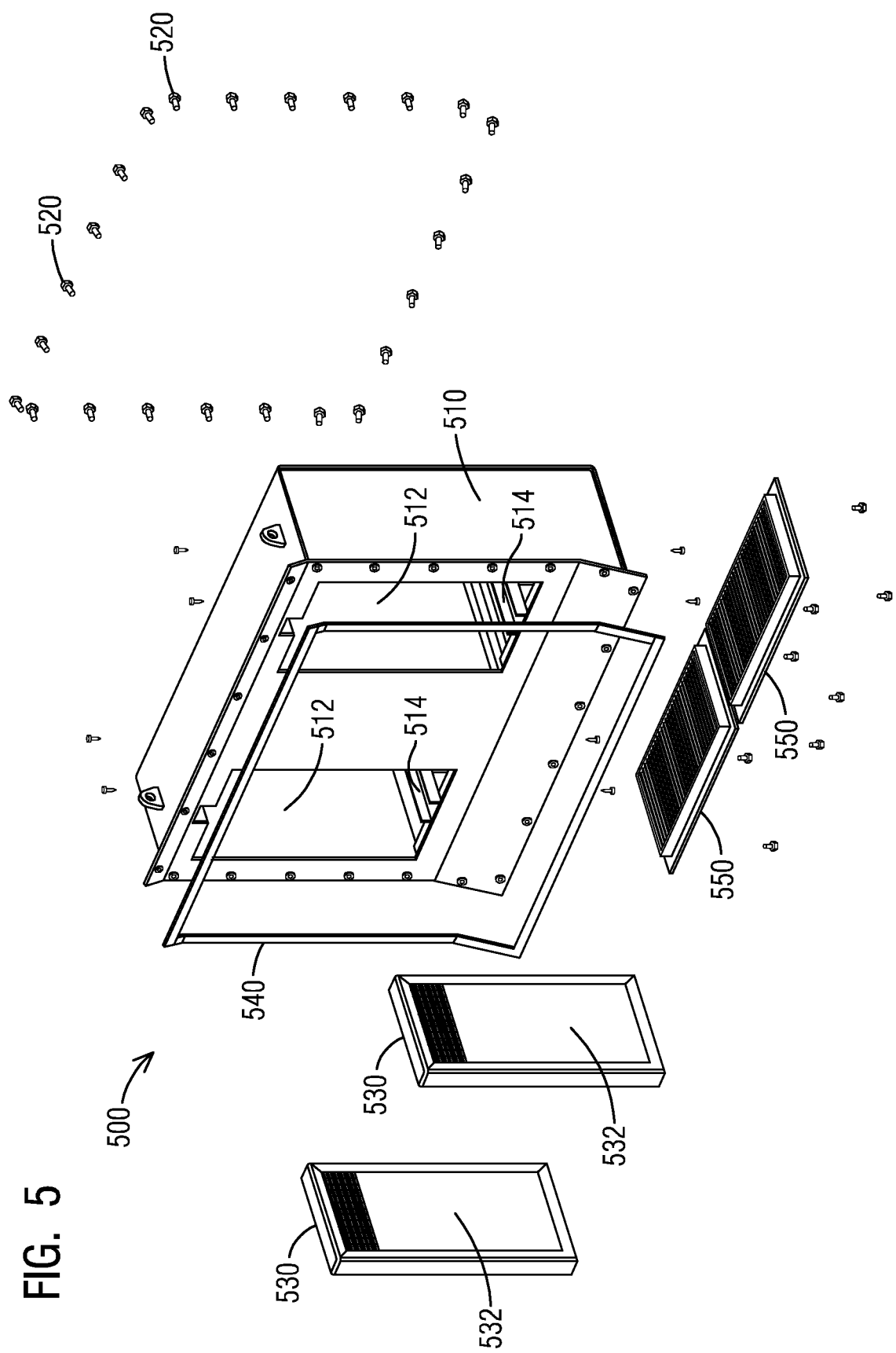
FIG. 5 illustrates an exploded view of a modular exhaust assembly in accordance with an exemplary embodiment of the present disclosure.

FIG. 5 and FIG. 6 illustrate an exploded view and an isometric view of a modular exhaust assembly 500 in accordance with an exemplary embodiment of the present disclosure.

The modular exhaust assembly 500 comprises an exhaust cover 510 and at least one acoustical splitter component 530. The exhaust cover 510 is coupled to the electric machine 400, see FIG. 4, specifically to the frame or housing 410 by bolts 520. In an example, the assembly 500 comprises two acoustical splitter components 530, but may comprise only one or more than two splitter components 530 according to for example specific requirements of the machine 400 or the exhaust assembly 500. The exhaust cover 510 may be constructed from sheet metal.

The exhaust cover 510 comprises one or more recesses 512, each recess 512 configured to receive an acoustical splitter component 530. Each recess 512 comprises a guide rail 514 for inserting an acoustical splitter component 530 into the rail 514 and thereby the recess 512. Multiple acoustical splitter components 530 can be arranged parallel to each other, each splitter component 530 in a separate recess 512 or multiple splitter components 530 in a common recess 512. The acoustical splitter components 530 are integrated into the exhaust cover 510 via the recesses 512.

Each acoustical splitter component 530 comprises sound absorbing material(s) 532 for reducing noise of the machine 400 when in operation. One of ordinary skill in the art is familiar with sound absorbing materials which include for example steel wool, fiberglass, types of foam, mineral wool or a stainless-steel mesh to name a few. The sound absorbing material(s) 532 for the splitter components 530 may be selected according to specific requirements, wherein the splitter components 530 may comprise combinations of sound absorbing materials. For example, the sound absorbing materials 532 may be selected according to a sound frequency or wavelength emitted by the machine and to be absorbed. For example, the number of acoustical splitter components 530 and/or sound absorbing materials 532 may be selected for absorbing sound frequencies in the range of 2 to 4 kHz.

The modular exhaust assembly 500 further comprises a gasket 540, wherein the gasket 540, when the exhaust assembly 500 is assembled and coupled to an electric machine, is arranged between the exhaust cover 510 and a frame or housing of the machine. The gasket 540 provides a seal between the exhaust assembly 500 and the electric machine. With the exhaust assembly 500, the electric machine provides IP44 rating. IP44 rating indicates protection from the intrusion of water, specifically protection from water spray in any direction.

In a further embodiment, the modular exhaust assembly 500 comprises at least one louver 550 allowing cooling fluid to exit or enter. For example, when the exhaust assembly 500 is mounted to an electric machine, the at least one louver 550 allows cooling fluid, such as air, of the electric machine to exit the electric machine via the exhaust assembly 500. The embodiment of FIG. 5 and FIG. 6 shows multiple louvers 550, but the exhaust assembly 500 may comprise only one louver 550 or more than two louvers 550 at various places of the exhaust assembly 500.

Integrating the splitter components 530 into the exhaust cover 510, noise level, weight and size can be optimized, compared to other auxiliary mounted noise attenuators. Dimensions, placement and number of splitter elements 530 can be tuned according to available space and anticipated noise emission profile.

Figure 7:
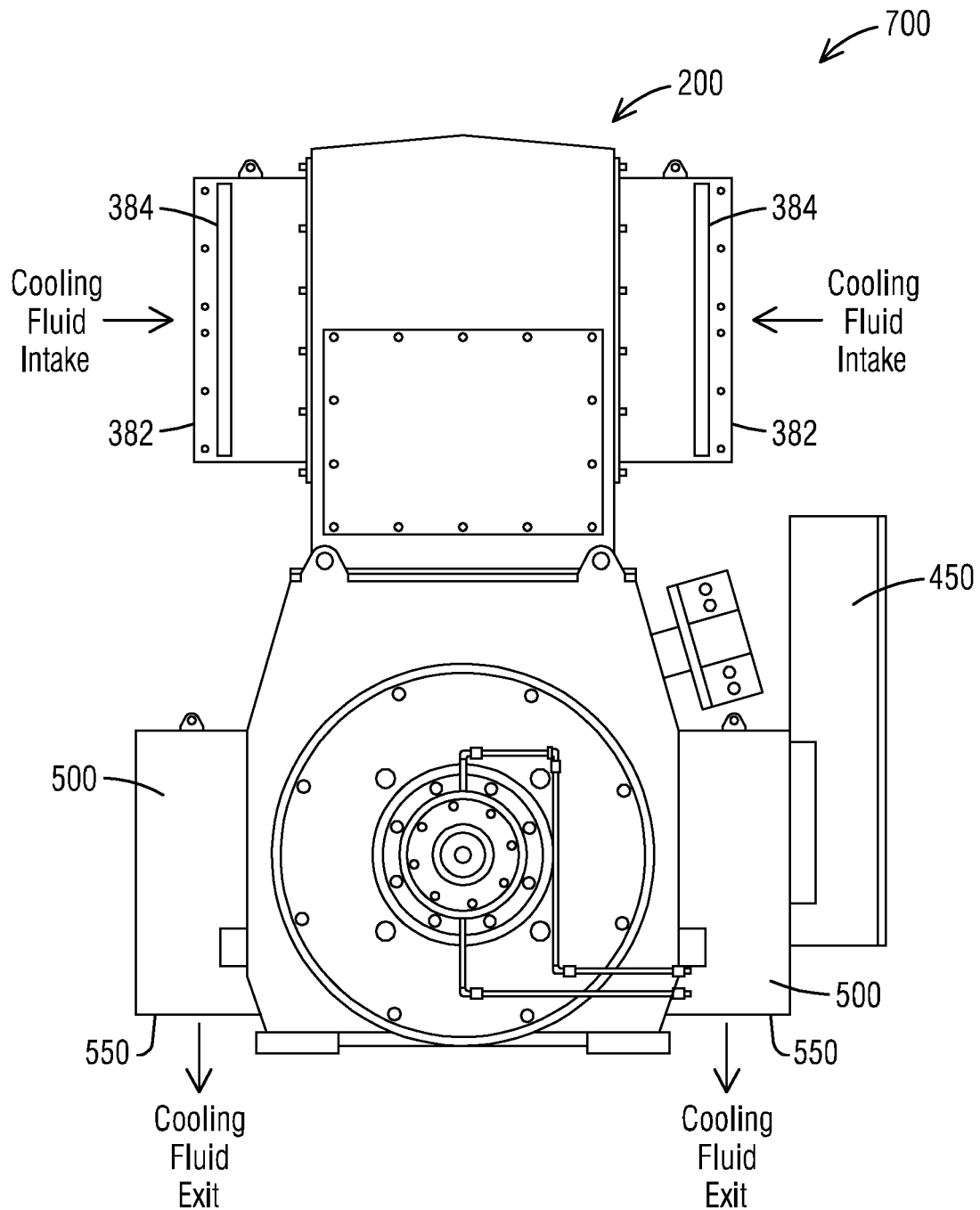
FIG. 7 illustrates a side view of an electric machine with an auxiliary blower mounting arrangement and a modular exhaust assembly in accordance with an exemplary embodiment of the present disclosure.

FIG. 7 illustrates a side view of an electric machine 700 comprising an auxiliary blower mounting arrangement 200 and a modular exhaust assembly 500. The auxiliary blower mounting arrangement 200 may be configured as described with reference to FIG. 2 and FIG. 3, and the modular exhaust assembly 500 may be configured as described with reference to FIG. 5 and FIG. 6.

FIG. 7 illustrates that the electric machine 700, which can be an induction motor, comprises both the auxiliary blower mounting arrangement 200 and the module exhaust assembly 500. However, the electric machine 700 may only comprise the auxiliary blower mounting arrangement 200 or only the modular exhaust assembly 500.

Cooling fluid for cooling the electric machine 700, specifically the rotor assembly and stator assembly, enters the auxiliary blower mounting arrangement 200 via fluid intakes 382. The cooling fluid is gaseous, for example ambient air. Each fluid intake 382 may comprise a filter 384 for filtering out dirt particles, dust etc before the cooling fluid enters the machine 700. The cooling fluid flows through an interior of the electric machine 700 according to an internal fluid flow path as illustrated for example in FIG. 3. Eventually, the saturated (hot) cooling fluid will exit the machine 700 through the louvers 550 of the modular exhaust assembly 500. Further, the auxiliary blower mounting arrangement 200 provides a blower motor fluid flow path for circulating cooling fluid cooling the blower motor.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

The invention claimed is:
1. An electric machine comprising:
a frame and a plurality of electrical components including a rotor assembly and a stator assembly,
an auxiliary blower mounting arrangement for cooling the electrical components by creating an internal fluid flow path between the electrical components and the auxiliary blower mounting arrangement,
wherein the auxiliary blower mounting arrangement comprises a blower motor and a motor mount, wherein the blower motor is coupled to the frame and positioned inside the motor mount, and wherein the motor mount comprises a plurality of cooling openings for creating a blower motor fluid flow path for cooling the blower motor, and
further comprising a housing covering the auxiliary blower mounting arrangement, the housing comprising multiple fluid intakes providing cooling fluid for the internal fluid flow path and the blower motor fluid flow path.

2. The electric machine of claim 1, wherein the motor mount is adapted as mounting box comprising sheet metal.

3. The electric machine of claim 1, wherein the motor mount is bolted to the frame.

4. The electric machine of claim 1, wherein the motor mount comprises lower cooling openings and upper cooling openings, a cooling fluid entering the motor mount through the lower cooling openings and exiting the motor mount through the upper cooling openings thereby creating the blower motor fluid flow path for cooling the blower motor positioned inside the motor mount.

5. The electric machine of claim 1, wherein the auxiliary blower mounting arrangement is arranged on top of an upper surface of the frame.

6. The electric machine of claim 5, wherein the blower motor is arranged vertically inside the motor mount and coupled to the upper surface of the frame by a connection point.

7. The electric machine of claim 1, wherein the auxiliary blower mounting arrangement further comprises a blower coupled to a rotating shaft of the blower motor.

8. The electric machine of claim 1, configured as alternating current (AC) induction motor.

9. The electric machine of claim 1, the housing further comprising multiple filters positioned at the fluid intakes.

10. An electric machine comprising:
a frame and a plurality of electrical components including a rotor assembly and a stator assembly,
a modular exhaust assembly for noise attenuation, the modular exhaust assembly comprising at least one acoustical splitter component and an exhaust cover, the exhaust cover coupled to the frame,
wherein the modular exhaust assembly further comprises at least one louver allowing cooling fluid for cooling the electrical components along an internal fluid flow path to exit the electric machine, and comprising first and second modular exhaust assemblies arranged on opposite sides of the frame.

11. The electric machine of claim 10, wherein the exhaust cover comprises a recess for integrating the at least one acoustical splitter component into the exhaust cover.

12. The electric machine of claim 11, wherein the recess comprises a guide rail for inserting the at least one acoustical splitter component into the recess.

13. The electric machine of claim 12, wherein the at least one acoustical splitter component comprises sound absorbing material.

14. The electric machine of claim 10, wherein the modular exhaust assembly further comprises a gasket, the gasket being arranged between the exhaust cover and the frame.

15. The electric machine of claim 10, wherein the exhaust cover is coupled to the frame using multiple bolts.

16. The electric machine of claim 10, further comprising:
an auxiliary blower mounting arrangement for cooling of the electrical components along the internal fluid flow path, wherein the auxiliary blower mounting arrangement comprises a blower motor and a motor mount, wherein the blower motor is coupled to the frame and positioned inside the motor mount, and wherein the motor mount comprises a plurality of cooling openings for creating a blower motor fluid flow path for cooling of the blower motor.

17. The electric machine of claim 16, wherein the auxiliary blower mounting arrangement is arranged on top of an upper surface of the frame, and wherein the cooling fluid enters the electric machine through the auxiliary blower mounting arrangement and exits the electric machine through the at least one louver of the modular exhaust assembly after cooling of the electrical components.

* * * * *